(12) United States Patent
Pool et al.

(10) Patent No.: US 9,822,628 B2
(45) Date of Patent: Nov. 21, 2017

(54) SEALING ELEMENT WEAR DETECTION FOR WELLBORE DEVICES

(71) Applicant: HALLIBURTON ENERGY SERVICES, INC., Houston, TX (US)

(72) Inventors: Charles Michael Pool, Bedford, TX (US); Christopher Allen Grace, Coppell, TX (US); Craig W. Godfrey, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 95 days.

(21) Appl. No.: 14/398,032

(22) PCT Filed: Oct. 23, 2013

(86) PCT No.: PCT/US2013/066301
§ 371 (c)(1),
(2) Date: Oct. 30, 2014

(87) PCT Pub. No.: WO2015/060836
PCT Pub. Date: Apr. 30, 2015

(65) Prior Publication Data
US 2016/0273333 A1 Sep. 22, 2016

(51) Int. Cl.
*E21B 33/02* (2006.01)
*E21B 33/08* (2006.01)
*E21B 47/00* (2012.01)
*G01L 5/00* (2006.01)

(52) U.S. Cl.
CPC ............ *E21B 47/00* (2013.01); *E21B 33/085* (2013.01); *G01L 5/00* (2013.01)

(58) Field of Classification Search
CPC combination set(s) only.
See application file for complete search history.

(56) References Cited

U.S. PATENT DOCUMENTS

| 3,080,454 A * | 3/1963 | Wenrich | H04M 9/001 379/170 |
|---|---|---|---|
| 5,386,724 A | 2/1995 | Das et al. | |
| 6,138,774 A | 10/2000 | Bourgoyne et al. | |

(Continued)

FOREIGN PATENT DOCUMENTS

| WO | 2007030461 | 5/2007 |
| WO | 2013006165 | 1/2013 |
| WO | 2014105077 | 7/2014 |

OTHER PUBLICATIONS

International Patent Application No. PCT/US2013/066301, "International Search Report and Written Opinion", mailed Jul. 24, 2014, 9 pages.

*Primary Examiner* — David L Andrews
*Assistant Examiner* — Ronald R Runyan
(74) *Attorney, Agent, or Firm* — Kilpatrick Townsend & Stockton LLP

(57) ABSTRACT

A system is provided that can include a rotating control device (RCD) with a sealing element and a force measurement device for measuring an axial force imparted to the sealing element. The system can also include a computing device that is communicatively coupled to the force measurement device for receiving the axial force measurements and from which the wear status of the sealing element can be determined.

22 Claims, 5 Drawing Sheets

(56) References Cited

U.S. PATENT DOCUMENTS

| | | | |
|---|---|---|---|
| 6,907,375 B2* | 6/2005 | Guggari | G06Q 10/06 340/853.2 |
| 7,337,854 B2 | 3/2008 | Horn et al. | |
| 7,950,474 B2 | 5/2011 | Leduc et al. | |
| 8,038,177 B2 | 10/2011 | Gutierrez-Lemini et al. | |
| 8,096,711 B2 | 1/2012 | Beauchamp et al. | |
| 8,322,432 B2 | 12/2012 | Bailey et al. | |
| 2002/0124640 A1 | 9/2002 | Brewer | |
| 2006/0037782 A1* | 2/2006 | Martin-Marshall | E21B 33/085 175/40 |
| 2006/0185844 A1 | 8/2006 | Patterson | |
| 2006/0195264 A1* | 8/2006 | Galil El Askary | E21B 7/046 702/7 |
| 2008/0060846 A1* | 3/2008 | Belcher | E21B 17/042 175/25 |
| 2008/0296016 A1* | 12/2008 | Hughes | E21B 33/085 166/250.01 |
| 2009/0071645 A1 | 3/2009 | Kenison et al. | |
| 2009/0315267 A1* | 12/2009 | Castleman | F16J 15/064 277/312 |
| 2012/0217022 A1 | 8/2012 | Michaud et al. | |
| 2012/0292106 A1 | 11/2012 | Orbell et al. | |
| 2013/0118749 A1 | 5/2013 | Hannegan et al. | |
| 2013/0264118 A1 | 10/2013 | Wideman et al. | |
| 2015/0308253 A1* | 10/2015 | Clark | E21B 33/085 175/24 |
| 2015/0337599 A1* | 11/2015 | Bullock | E21B 33/085 175/24 |

* cited by examiner

SEALING ELEMENT WEAR DETECTION FOR WELLBORE DEVICES

CROSS-REFERENCE TO RELATED APPLICATIONS

This is a U.S. national phase under 35 U.S.C. 371 of International Patent Application No. PCT/US2013/066301, titled "Sealing Element Wear Detection for Wellbore Devices" and filed Oct. 23, 2013, the entirety of which is incorporated herein by reference.

TECHNICAL FIELD

The present disclosure relates generally to assemblies for a wellbore and, more particularly (although not necessarily exclusively), to determining wear of the elastomeric sealing element of a device, such as a rotating control device (RCD), by measuring the force imparted to the sealing element.

BACKGROUND

Drilling operations may incorporate a rotating control device (RCD) or a rotating control head. An RCD may be located on a surface stack. The RCD can be located on top of a blowout preventer (BOP) and the BOP can be located on top of a wellhead. The RCD can seal the wellbore at the surface by sealing around a drill pipe. The RCD can include an RCD sealing element that surrounds and directly contacts the drill pipe. The RCD sealing element can experience wear over time, and it can eventually fail, requiring replacement.

DETAILED DESCRIPTION

Figure 1:
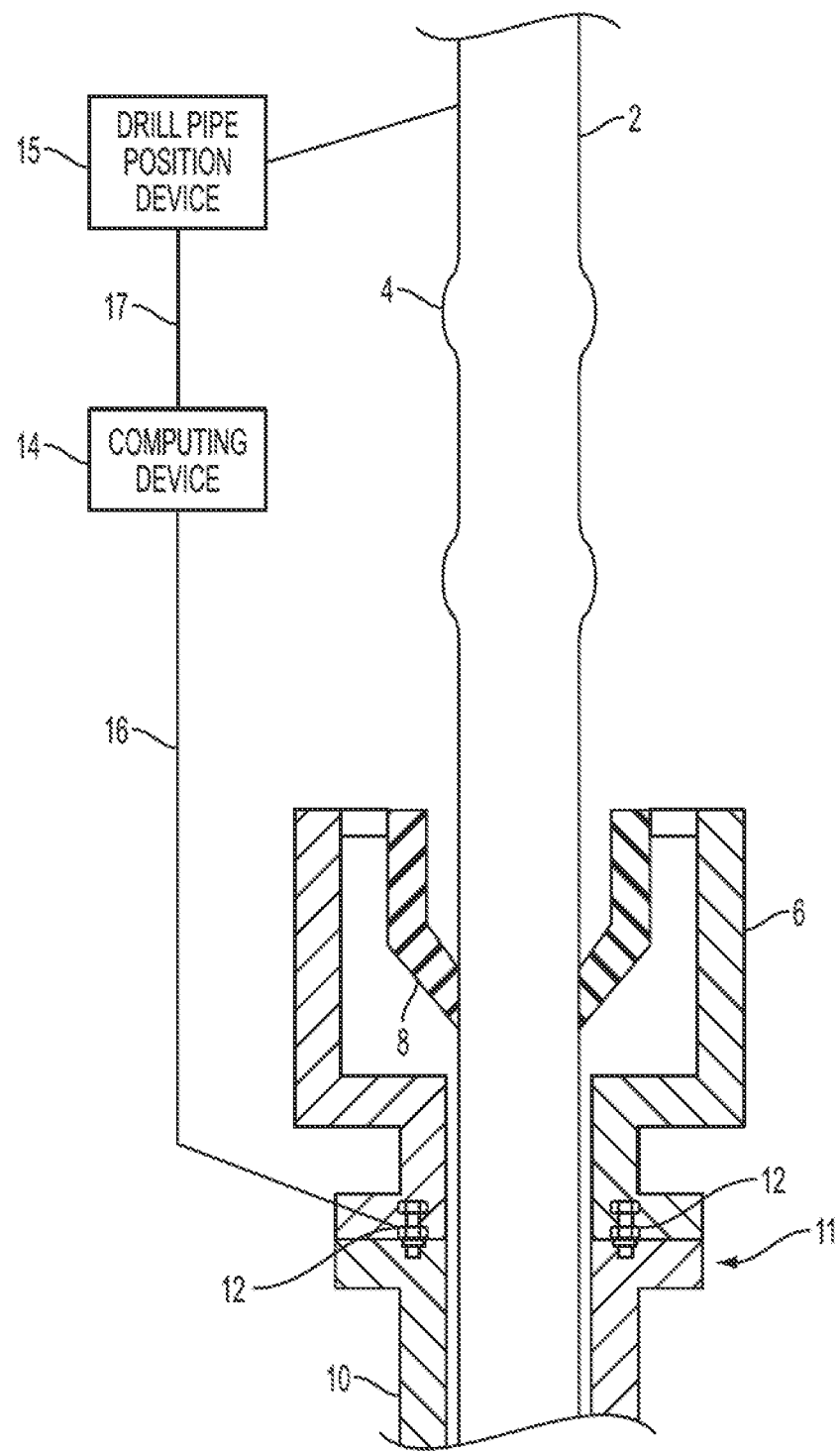
FIG. 1 is a cross-sectional side view of a representative wellhead surface stack that includes a sealing element wear detection assembly for a rotating control device (RCD) according to one embodiment.

Certain aspects and features of the present disclosure relate to determining wear of an elastomeric sealing element of a rotating control device (RCD), for predicting failure. In one example implementation, the wear of the sealing element can be determined by measuring an axial force imparted to the sealing element by a drill pipe when the drill pipe is stripped in and out of the sealing element. An RCD can be any equipment through which drill pipe can pass and that is designed with the purpose of allowing rotation of the drill pipe and containment of pressure or fluid to surface by the use of seals or packers that contact and seal against the drill pipe (or other types of tubular elements such as casing).

A force measurement device, for example, but not limited to a load cell, can be mounted between the RCD body and a blowout preventer (BOP). In one aspect, the RCD body connection to the BOP may be flanged and the force measurement device can be positioned between the RCD body and the BOP. In other aspects, the force measurement device may be mounted at another suitable location or is a weight indicator that may be present on a rig. The load cell can measure the axial force imparted to the sealing element as the drill pipe travels through the sealing element. The drill pipe may include one or more drill pipe connections or tool joints.

Multiple forces may be imparted to the sealing element. Pressure from the wellbore may impart a force to the sealing element. The drill pipe may impart a force in an axial direction to the sealing element, from friction between the drill pipe and the RCD as the drill pipe is stripping through the RCD by moving through the RCD in a downhole direction or in an uphole direction. For example, to ensure a proper seal, the sealing element frictionally, sealingly engages the drill pipe, and remains in frictional, sealing engagement with the drill pipe as the drill pipe moves within the wellbore. Thus, as the drill pipe is lowered into the well, such as during drilling, the drill pipe imparts a force to the sealing element that is axially downwards. Conversely, as the drill pipe is raised within the well, such as when tripping out of the well, the drill pipe imparts a force to the sealing element that is axially upwards. The bearing assembly and the RCD body, which retain the sealing element at a fixed axial location within the wellbore, impart a reaction force to the sealing element. That is, as the drill pipe is moving downward, the bearing assembly and the RCD body impart an upward force on the sealing element that is equal to and opposite the downward friction force applied to the sealing element by the drill string. The load cell positioned at the flanged connection between the RCD body and the BOP can measure the axial force imparted to the sealing element. In another embodiment, the load cell can measure other potential forces imparted to the sealing element in addition to the axial force.

The load cell can be in communication with a data acquisition system or other type of computing device via wired or wireless communication links. The computing device can receive and record a baseline set of measurements of the axial forces imparted to a sealing element as the drill pipe contacts and moves through the sealing element. The baseline set of measurements may be used for comparison to subsequently measured axial force values. The baseline set of measurements may be one measurement that is obtained at any time during the life of the sealing elements. In some embodiments, the computing device can also receive the position of the drill pipe. In other embodiments, the position of the drill pipe can be inferred by the computing device based on the changes in the axial force measured by the load cell. In still other embodiments, the position of the drill pipe is not utilized by the computing device. The computing device can create a visual representation of the axial force measurements as a function of the axial force versus the drill pipe position.

The computing device can receive subsequent measurements of the axial forces on the sealing element over a period of time as the sealing element wears. In one embodiment, the computing device can output a graphical depiction of the subsequent axial force measurement. Changes in the geometry and property of the sealing element may result in changes in the axial force wear plot of the sealing element over a period of time. The computing device can determine the wear status of the sealing element by analyzing changes in the axial force measurement imparted to the load cell over a period of time. In one embodiment, the computing device can analyze a change in slope in the axial force plot, or a change in magnitude of the axial force response, between the baseline axial measurements and subsequent axial measurements to determine the wear status of the sealing element. In another embodiment, the computing device can perform additional or different analysis on the axial force measurements collected over a period of time. The computing device can compare the changes in the slope or magnitude of the axial force wear plots to a pre-set value. The pre-set value can be input to the computing device by a user. If the change in the slope or magnitude exceeds the pre-set value, the computing device may display a notification or alarm indicating the wear status of the sealing element.

A fiber optic sensor, strain gauge, or other device can be used instead of a load cell to measure the axial force imparted to the sealing element. In some embodiments, the weight indicator of the rig can be coupled to the drill pipe to measure the effective axial force imparted to the sealing element by the drill pipe.

These illustrative aspects and examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of part of a wellhead surface stack assembly and a sealing element wear detection system for an RCD 6. The surface stack assembly includes the RCD 6 about a drill pipe 2 and with an RCD sealing element 8. The RCD 6 is coupled to a BOP 10. The drill pipe 2 includes one or more tool joints 4. The drill pipe 2 extends through the RCD 6 (including through the sealing element 8) and the BOP 10. The sealing element wear detection system includes a force measurement device, which may be a load cell 12, and a computing device 14. The load cell 12 can be mounted on an RCD body connection 11 at which the RCD 6 couples to the BOP 10. The RCD body connection 11 may be flanged and the load cell 12 can be mounted at the flanged connection between the body of the RCD 6 and the BOP 10. In another example, the force measurement device is located in suitable locations, for example within the RCD 6 or around the RCD body, other than at the flanged connection. The load cell 12 can transmit the axial force measurement to a computing device 14 via a wired connection 16 or via wireless communication. The computing device 14 can record the axial force measurement to use for comparison later. In one embodiment, the load cell 12 is a compression load washer load cell.

The drill pipe 2 can move through the sealing element 8 as the drill pipe 2 is stripped in and out of the well. One or more tool joints 4 of the drill pipe 2 can also move through the sealing element 8. The drill pipe 2 and the tool joints 4 can exert axial forces on the sealing element 8 as a result of the friction between the drill pipe 2 (and the tool joints 4) and the sealing element 8. The contact area between the sealing element 8 and the tool joints 4 may be greater than the contact area between the sealing element 8 and the drill pipe 2 as the drill pipe 2 and tool joints 4 strip through the sealing element 8. The frictional force imparted to the load cell 12 may increase as a tool joint 4 moves through the sealing element 8 as a result of the increased contact area between the tool joint 4 and the sealing element 8. The frictional force between the drill pipe 2 and the sealing element 8 can oppose the axial force generated by the well pressure. The axial force measured by the load cell 12 may therefore decrease as the frictional force increases. For example, the axial force imparted to the load cell 12 may decrease as the tool joint 4 travels through the sealing element 8, as a result of the increased contact area and increased frictional force between the tool joint 4 and the sealing element 8. The other forces can also change as the condition of the sealing element 8 changes.

The computing device 14 can receive information regarding the position of the drill pipe 2 and the tool joints 4 from a drill pipe position device 15. The drill pipe position device 15 can be coupled to the drill pipe 2 and can communicate with the computing device 14 via a communication line 17. In other embodiments, the drill pipe position device 15 can communicate with the computing device 14 via a wireless communication link. In still other embodiments, the position of the drill pipe 2 may be inferred by the computing device 14. The computing device 14 may infer the position of the drill pipe based on the axial forces measured by the load cell 12. In still yet other embodiments, the position of the drill pipe 2 may not be considered by the computing device 14. The computing device 14 may include a processor device that can execute code stored on a non-transitory computer-readable medium. Examples of the computing device 14 include a personal computer, a server device, a laptop, a smart phone, and a tablet device.

The computing device 14 can receive and record the axial force measurements measured by the load cell 12. The computing device 14 can create a baseline axial force measurement profile based on the initial measured axial force imparted to the sealing element 8. The computing device 14 may create a visual representation of the baseline axial force measurement profile as a function of the measured axial force imparted to the sealing element 8 versus the position of the drill pipe 2. In other embodiments, the visual representation of the baseline axial force measurement profile may be a different type of profile plot. In still other embodiments, the baseline axial force measurement is pre-determined or received from an external source instead of being measured.

In some embodiments, the computing device 14 is remotely located from the load cell 12 and the drill pipe position device 15. For example, the computing device 14 can communicate data and information with the load cell 12, or a measurement device located closer to the load cell 12, and the drill pipe position device 15 over a communications network. The communications network can include communication links, which may include wireless links, satellite communication, telephone data links, other wired links, or a combination of these and other types of communication links. The computing device 14 in such an implementation may be located offsite from the rig.

Figure 2:
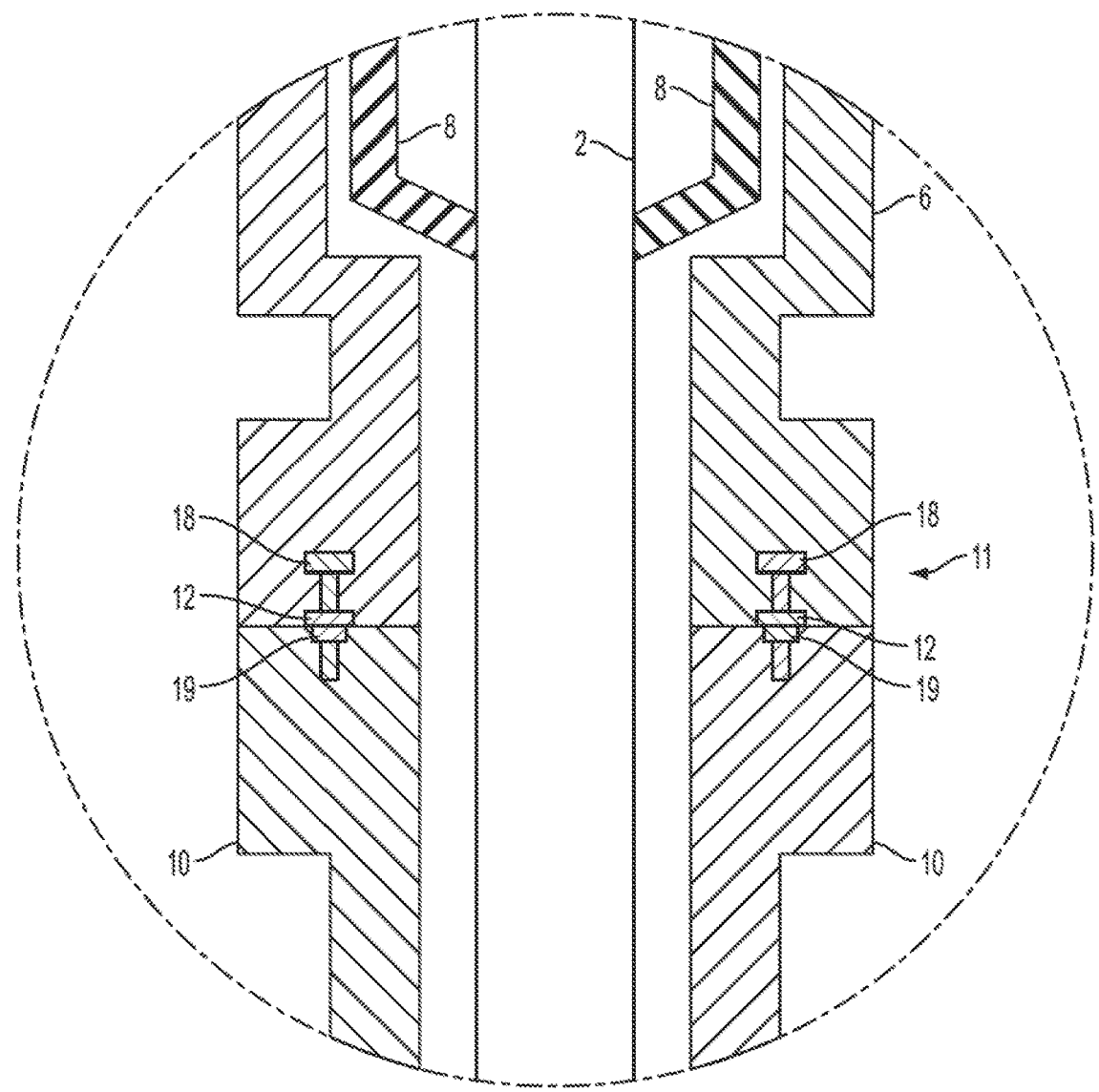
FIG. 2 is a cross-sectional side view of a load cell installed between an RCD assembly and a blowout preventer (BOP) according to one embodiment.

FIG. 2 depicts by cross-section an example of a force measurement device that is a load cell 12 mounted at the RCD body connection 11 to the BOP 10. The RCD body connection 11 is a flanged connection. The RCD body connection 11 can connect the RCD 6 to the BOP 10 via a bolt 18 and a nut 19. The load cell 12 may be a load washer that is secured at the head end of the bolt 18 at the flanged RCD body connection 11. In other embodiments, another type of connection is used to connect the RCD 6 and the BOP 10 instead of the bolt 18. In other embodiments, the load cell 12 is located within the RCD 6, instead of at the flanged connection, such that the load cell 12 can measure the axial force imparted to the RCD sealing element 8.

The drill pipe 2 can contact the sealing element 8 as the drill pipe 2 strips down through the RCD 6 and BOP 10.

Friction between the drill pipe 2 and the sealing element 8 can impart an axial force to the sealing element 8. The sealing element 8 can translate the axial force through an RCD bearing assembly and onto the body of the RCD 6. The axial force imparted to the body of the RCD 6 can be measured by the load cell 12 in its position between the RCD 6 and the BOP 10 at the RCD body connection 11. The axial force imparted to the body of the RCD and measured by the load cell 12 can thereby correspond to the axial force imparted to the sealing element 8.

Figure 3:
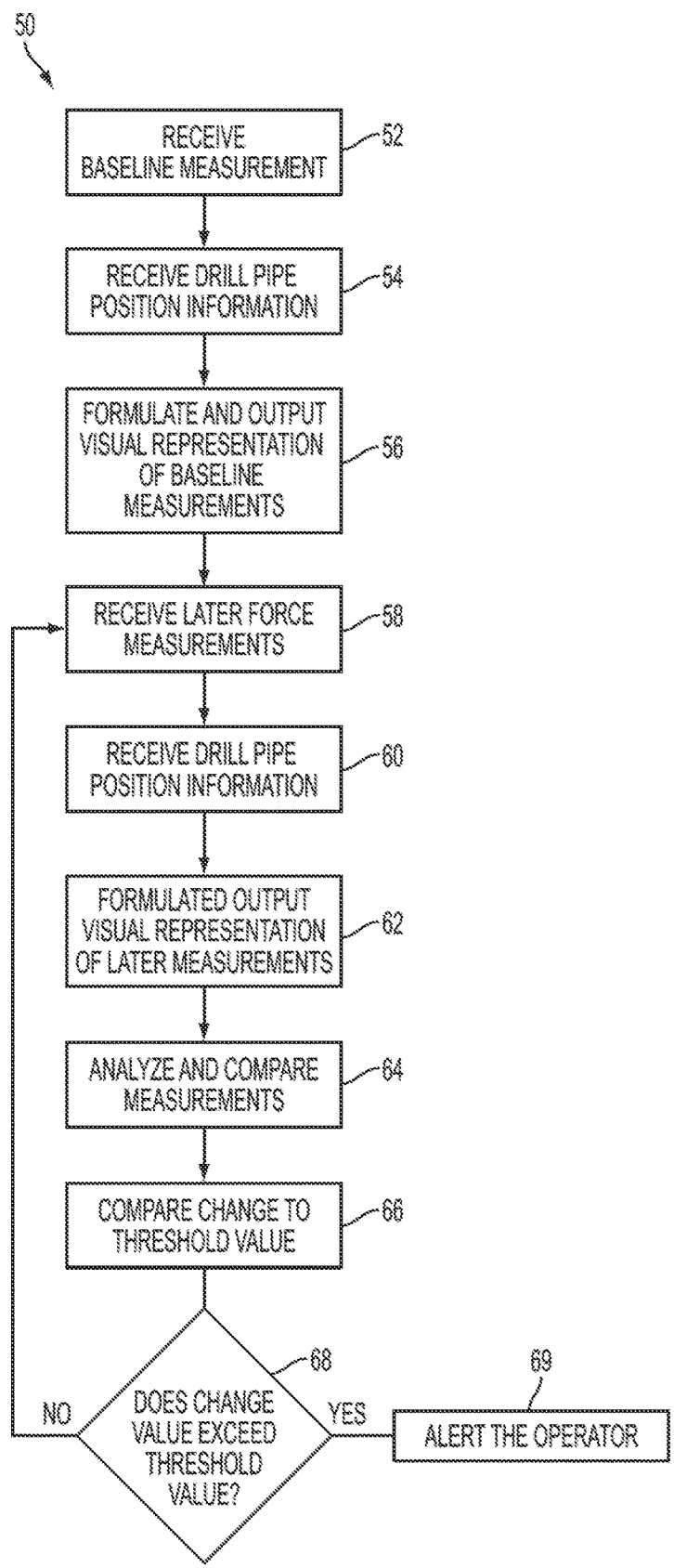
FIG. 3 is an example of flow chart for a process of determining wear of a sealing element according to one embodiment.

FIG. 3 depicts a flow chart of an example of a process 50 for determining the wear status of a sealing element. The process 50, or at least part of the process, can be performed by a computing device, such as the computing device 14 of FIG. 1, according to one embodiment.

In block 52, the computing device receives a measurement of an axial force imparted to a sealing element as a drill pipe, including one or more tool joints, travels through the sealing element, and identifies that measurement as the baseline measurement. The computing device can receive the axial force measurement from a force measurement device, such as a load cell, mounted on an RCD body or in an RCD. The computing device can receive the axial force measurement via a control line or other communication connection. In other embodiments, the computing device can receive the axial force measurement from a device in the wellbore that is in communication with the load cell. In other embodiments, the computing device receives a pre-determined baseline axial force measurement instead of a measured one.

In block 54, the computing device receives information regarding the drill pipe position during the time period that the baseline axial force measurement was measured. The computing device may receive the drill pipe position information from a drill pipe position device. The drill pipe position device can be mounted on the drill pipe and can communicate with the computing device via a communication line or other communication connection. In other embodiments, the computing device may infer the position of the drill pipe based on the changes in the axial force measured or the position can be received from the rig, which can record the position information.

In block 56, the computing device formulates and outputs a visual representation of the baseline axial force measurement as a baseline axial force versus the drill pipe position profile based on the received axial force measurement data. In other embodiments, the visual representation of the baseline axial force measurement may be a different type of axial force plot. In another embodiment, the computing device 14 may not formulate and output a visual representation of the baseline axial force measurement at block 56. Instead, the computing device may analyze the received baseline axial force measurement received at block 54 without outputting a visual representation at block 56.

In block 58, the computing device receives subsequent or later measurements of the axial force imparted to the sealing element as the drill pipe and the tool joint strip through the sealing element, and measured by the load cell. In block 60, the computing device receives information regarding the subsequent position of the drill pipe. In other embodiments, the computing device may infer the position of the drill pipe during the received subsequent force measurements.

In block 62, the computing device formulates and outputs a visual representation of the subsequent measured axial force versus drill pipe position wear plot. The visual representation may be formulated based on the received subsequent axial force measurements and the received or inferred drill position information. In another embodiment, the visual representation may be a different type of plot based on the received subsequent axial force measurements. In another embodiment, the computing device may not output a visual representation at block 62. Instead, the computing device may analyze the subsequent measured axial force received in block 58 without outputting a visual representation at block 62.

In block 64, the computing device analyzes the baseline axial force versus drill pipe position wear plot to the subsequent axial force versus drill pipe position wear plot and determines the changes in the magnitude and the slope. In other embodiments, the force versus drill pipe position wear plot are also be compared. In another embodiment, the computing device compares the baseline axial force measurement received at block 54 and the subsequent measured axial force received at block 58 instead of analyzing the visual representations of the measurements.

In block 66, the computing device compares the calculated changes in the magnitude and the slope to a threshold value. The threshold value may be a pre-set value that is selected by a user and received by the computing device. In block 68, the computing device determines whether the calculated change exceeds the threshold value.

If the computing device determines that the calculated change does not exceed the threshold value, the computing device returns to block 58. If the changes exceed the selected pre-set value, the computing device alerts the operator in block 69. The computing device may alert the operator via a message, an alarm, or another suitable alert indicating that the sealing element may be near a wear-type failure. In some embodiments, the computing device outputs an alert to a remotely located operator by transmitting a signal representing an indication of an alarm condition to a device located remote from the wellbore site at which the sealing element is positioned. In other embodiments, a person compares the baseline axial force versus drill pipe position wear plot with the subsequent measured axial force versus drill pipe position wear plot. The person may determine whether a change in the magnitude or slope of the axial force plots indicates the sealing element is near a wear-type failure. In another embodiment, the person determines whether a change in the magnitude of the axial force while the tool joint travels through the sealing element indicates the sealing element is near a wear-type failure. In other embodiments, other parameters are be measured and compared to determine the status of the sealing element.

Figure 4:
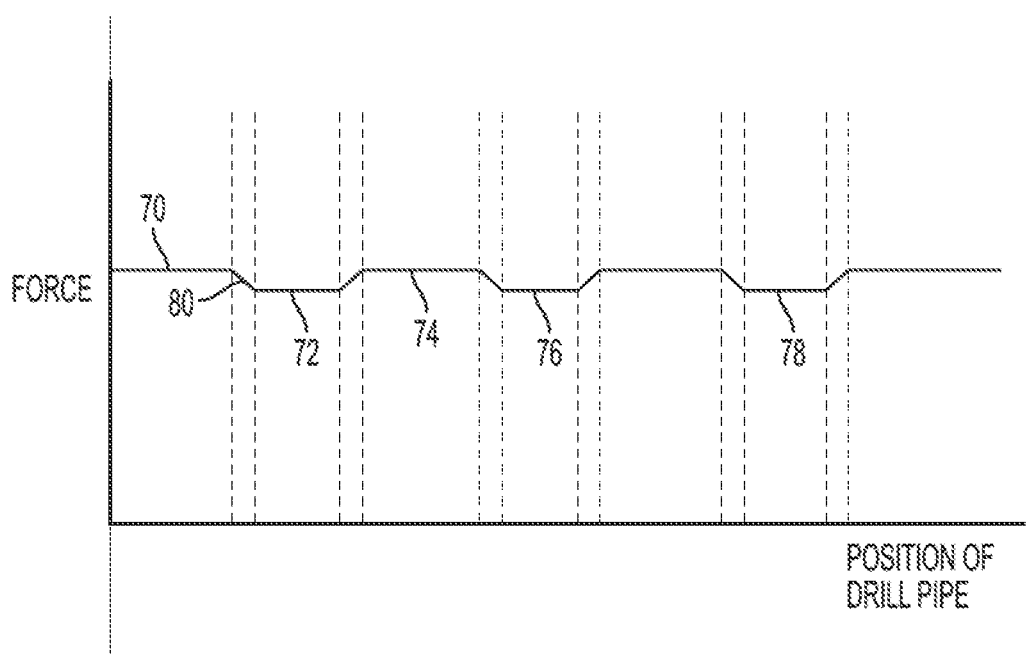
FIG. 4 is an example of a graph of a wear plot of a tool joint profile according to one embodiment.

FIG. 4 depicts an example of a baseline wear plot for a sealing element. The wear plot may be generated by a computing device, such as the computing device 14 in FIG. 1, for display on a graphical user interface. The wear plot can graphically depict an axial force versus drill pipe position wear plot for the sealing element. The axial force 72 as a first tool joint travels through the sealing element may be less than the axial force 74 when a drill pipe travels through the sealing element at a later time. The decrease in the axial force 80 when the tool joint travels through the sealing element may be caused by the increase in the frictional force between the tool joint and the sealing element. The frictional force may oppose the force generated by the well pressure and, therefore, as the frictional force increases, the measured axial force decreases. The frictional force can increase as the contact area between the drill pipe and the sealing element increases, as it may when the tool joint strips through the sealing element. As a result, the axial force may decrease as the tool joint strips through the sealing element. The wear plot 70 also depicts a second tool joint profile 76 and a third tool joint profile 78, which represent the axial force as a second tool joint and a third tool joint pass through the sealing element.

The sealing element wears as the drill pipe and the tool joint travel through the sealing element. Changes in the geometry and property of the sealing element can be depicted as changes in the axial force versus the drill pipe position wear plot of each stroke of the drill pipe through the sealing element. For example, a coefficient of friction of the sealing element can change and the axial force versus drill pipe position wear plot of the sealing element may have many different shapes depending on variables, such as where the force is being measured, how much pressure is being exerted by the wellbore, what direction the drill pipe is being stripped, and the type of material from which the sealing element is made.

Figure 5:
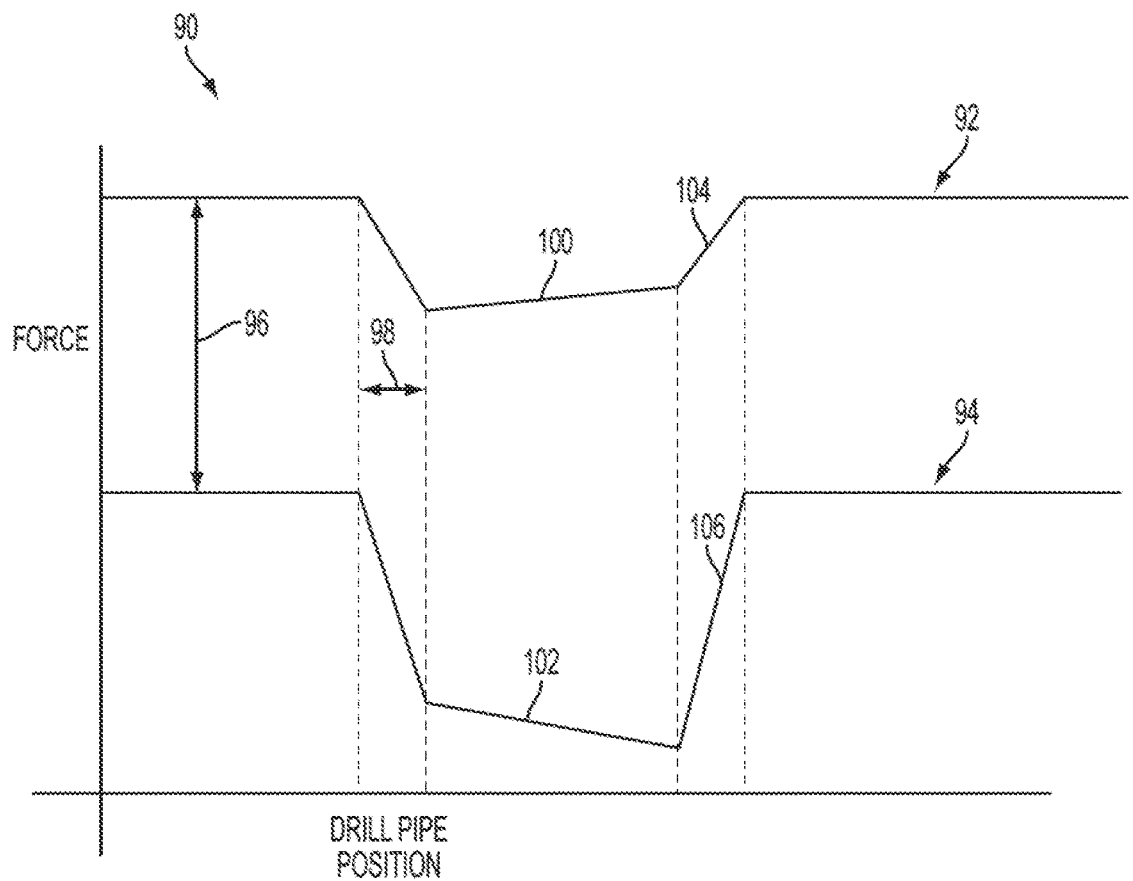
FIG. 5 is an example of a graph of a wear plot of an initial tool joint profile and a subsequent tool joint profile according to one embodiment.

FIG. 5 depicts an example of a wear plot 90 for a sealing element. The wear plot may be generated by a computing device, such as the computing device 14 of FIG. 1, for display on a graphical user interface. The wear plot can graphically depict the axial force versus drill pipe position for the sealing element. The wear plot 90 includes a first tool joint profile 92 representing the axial force versus the drill pipe position as the tool joint travels through the sealing element for the first time. The wear plot 90 also includes a subsequent tool joint profile 94 representing the axial force versus the drill pipe position as the tool joint travels through the sealing element at a subsequent time. The subsequent tool joint profile 94 may, for example, represent the tool joint passing through the sealing element for the thousandth time.

The subsequent tool joint profile 94 may exhibit changes when compared to the first tool joint profile 92 as the sealing element wears. In one embodiment, a computing device analyzes the changes between the first tool joint profile 92 and the subsequent tool joint profile 94 for indications that the sealing element is near failure. In another embodiment, a person analyzes and compares the first tool joint profile 92 and the subsequent tool joint profile 94 to determine the status of the sealing element.

In some embodiments, the magnitude of the axial force versus drill pipe position wear plot at the time when the tool joint travels through the sealing element can change. For example, FIG. 5 shows a decrease in stripping force 96 between the first tool joint profile 92 and the subsequent tool joint profile 94. The decrease 96 between the first tool joint profile 92 and subsequent tool joint profile 94 may indicate that the sealing element is worn.

The tool joint profiles 92, 94 can exhibit other changes. The first tool joint profile 92 and subsequent tool joint profile 94 may demonstrate a shift in the slope in the region 98, representing the transition from the drill pipe imparting the axial force to the sealing element to the tool joint imparting the axial force to the sealing element. The slope of the first tool joint profile 92 at the region 100 where the sealing element becomes fully engaged by the tool joint may differ from the same region 102 of the subsequent tool joint profile 94. The slope of the first tool joint profile 92 at the region 104 reflecting the transition from the tool joint back to the drill pipe may differ from the same region 106 of the subsequent tool joint profile 94.

The computing device or a person can determine that various changes between the first tool joint profile 92 and subsequent tool joint profile 94 indicate that the sealing element is susceptible to wear-type failure. The computing device or person may then alert the operator that the sealing element may need to be replaced.

By recording and comparing the first tool joint profile 92 to the subsequent tool joint profile 94, the computing device 14 can determine the state of the sealing element. For example, the computing device can determine whether the sealing element is near a wear-type failure. By determining the wear status of the sealing element, drilling rigs can effectively schedule sealing element changeover and reduce rig down time and costs associated with rig down time.

Although described with respect to an RCD, various embodiments can be used in any suitable device in addition or alternative to an RCD. For example, a non-rotating device may be used in some embodiments. Examples of suitable devices include a BOP and a casing stripper in a diverter.

In one embodiment, the system may include an RCD with a sealing element and a force measurement device for measuring an axial force imparted to the sealing element. The system may also include a computing device. The computing device may be communicatively coupled to the force measurement device for receiving the axial force measurements and from which the wear status of the sealing element is determined.

In one embodiment, a method of determining the wear status of an RCD sealing element is provided. A force measurement device can measure an axial force imparted to a sealing element of an RCD. A communications link can communicate to a computing device the axial force imparted to the sealing element. The computing device can record the measured axial force on the sealing element over a period of time. The computing device can also generate a graphical representation the axial force imparted to the sealing element over a period of time by which the wear status of the sealing element is determined.

In another embodiment, a system may include a computing device that includes a non-transitory computer readable medium on which is code that, when executed, causes the computing device to receive an axial force measurement from a force measurement device. The force measurement device may be located on an RCD body. The code, when executed, may cause the computing device to receive information regarding a drill pipe position. The code, when executed, may also cause the computing device to compare a baseline axial force measurement and a baseline drill pipe position to a subsequent axial force measurement and a subsequent drill pipe position.

The foregoing description of certain embodiments, including illustrated embodiments, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a wellbore device that includes a sealing element;
   a force measurement device for measuring an axial force imparted to the sealing element by a drill pipe, the force measurement device being mounted outside the sealing element, on a body of the wellbore device; and
   a computing device communicatively coupled to the force measurement device for receiving an axial force measurement for determining a wear status of the sealing element prior to failure of the sealing element.

2. The system of claim 1, wherein the computing device is communicatively coupled to the force measurement device for receiving a baseline axial force measurement on the sealing element and a subsequent axial force measurement on the sealing element, wherein the computing device includes a display for outputting a visual representation of the baseline axial force measurement and the subsequent axial force measurement generated by the computing device.

3. The system of claim 1, wherein the computing device is communicatively coupled to a drill pipe position device for receiving information regarding a position of the drill pipe and determining wear of the sealing element using the position of the drill pipe and the axial force measurement.

4. The system of claim 1, wherein the computing device includes a baseline axial force measurement on the sealing element that is predetermined rather than measured.

5. The system of claim 1, wherein the computing device is located offsite from the force measurement device and a drill pipe position device and includes a display for displaying charted measurements of the force measurement device and the drill pipe position device received over a communications network.

6. The system of claim 5, wherein the force measurement device is a load cell.

7. The system of claim 1, wherein the force measurement device comprises a load cell mounted at a flanged connection between a blowout preventer (BOP) and the wellbore device, wherein the wellbore device comprises a rotating control device (RCD).

8. The system of claim 1, wherein the force measurement device comprises a load cell.

9. The system of claim 1, wherein the wellbore device is a rotating control device (RCD).

10. A method comprising:
measuring, by a force measurement device, an axial force imparted to a sealing element of a rotating control device (RCD);
communicating, by a communication link, to a computing device the axial force imparted to the sealing element of the RCD;
recording, by the computing device, the axial force imparted to the sealing element over a period of time;
receiving, by the computing device from a drill pipe position device, a position of a drill pipe over the period of time the axial force is measured; and
generating, by the computing device, a graphical representation of the axial force imparted to the sealing element over the period of time by which a wear status of the sealing element is determined.

11. The method of claim 10, wherein the graphical representation of the axial force imparted to the sealing element over the period of time is an axial force versus drill pipe position plot, the method further comprising:
analyzing one or more changes in the axial force versus drill pipe position plot over the period of time; and
determining, based on the one or more changes, the wear status of the sealing element.

12. The method of claim 11, wherein determining the wear status of the sealing element includes comparing a change in a magnitude of the axial force versus drill pipe position plot over the period of time to a pre-set value.

13. The method of claim 12, wherein determining the wear status of the sealing element includes comparing a change in the slope at a specific region of the axial force versus the drill pipe position plot over the period of time to the pre-set value to determine the wear status of the sealing element.

14. The method of claim 10, further comprising:
comparing the axial force imparted to the sealing element to a previously measured baseline of the axial force imparted to the sealing element to determine a change in the axial force imparted to the sealing element.

15. The method of claim 14, further comprising:
outputting, by the computing device, an indicator that an alarm condition exists in response to the change exceeding a threshold.

16. The method of claim 15, wherein outputting the indicator that the alarm condition exists includes transmitting a signal representing the indicator to a remotely located device.

17. The method of claim 15, wherein the change is a slope in a transition between a drill pipe imparting the axial force on the sealing element and a tool joint imparting the axial force on the sealing element.

18. A system, comprising:
a computing device that includes a non-transitory computer readable medium on which is code that, when executed, causes the computing device to:
receive an axial force measurement from a force measurement device on a rotating control device (RCD) body of an RCD assembly;
receive information regarding a drill pipe position;
compare a baseline axial force measurement and a baseline drill pipe position to a subsequent axial force measurement and a subsequent drill pipe position; and
output a result of the comparison for determining wear of an elastomeric sealing element in the RCD assembly.

19. The system of claim 18, wherein the code, when executed, further causes the computing device to generate and output a graphical user interface (GUI) with a baseline plot depicting the baseline axial force measurement versus the baseline drill pipe position and a subsequent plot depicting the subsequent axial force measurement versus the subsequent drill pipe position.

20. The system of claim 19, wherein the code, when executed, further causes the computing device to calculate at least one change between the baseline plot and the subsequent plot.

21. The system of claim 20, wherein the at least one change is a change in a magnitude of an axial force between the baseline plot and the subsequent plot or a change in a slope of the axial force between the baseline plot and the subsequent plot.

22. The system of claim 21, wherein the code, when executed, further causes the computing device to compare the change in the magnitude or the slope to a pre-set value.

* * * * *